United States Patent [19]

Sundermann et al.

[11] Patent Number: 4,703,032

[45] Date of Patent: Oct. 27, 1987

[54] ACTIVE COKE PRODUCED FROM PIT COAL AND PRODUCTION PROCESS THEREOF

[75] Inventors: Erich Sundermann, Braunschweig; Hans Reye, Neustadt; Otto Abel, Clausthal-Zellerfeld, all of Fed. Rep. of Germany

[73] Assignee: Perfluktiv Technik AG, Zug, Switzerland

[21] Appl. No.: 810,284

[22] PCT Filed: Mar. 16, 1985

[86] PCT No.: PCT/EP85/00110

§ 371 Date: Jan. 9, 1986

§ 102(e) Date: Jan. 9, 1986

[87] PCT Pub. No.: WO85/04347

PCT Pub. Date: Oct. 10, 1985

[30] Foreign Application Priority Data

Mar. 24, 1984 [DE] Fed. Rep. of Germany ....... 3410892

[51] Int. Cl.⁴ ............................................. B01J 20/20
[52] U.S. Cl. ................................... 502/413; 502/417; 502/527
[58] Field of Search ................. 502/8, 413, 417, 527

[56] References Cited

U.S. PATENT DOCUMENTS

| | | | |
|---|---|---|---|
| 2,219,581 | 10/1940 | Schmidt | 252/2 |
| 2,697,029 | 12/1954 | Baker et al. | 502/8 |
| 2,991,201 | 7/1961 | Joyce | 502/413 |
| 3,960,771 | 6/1976 | Tanaka et al. | 252/446 |

FOREIGN PATENT DOCUMENTS

| | | | |
|---|---|---|---|
| 2003120 | 8/1971 | Fed. Rep. of Germany . | |
| 1186642 | 8/1959 | France . | |
| 69146 | 4/1984 | Japan | 502/413 |
| 261692 | 3/1927 | United Kingdom . | |
| 577792 | 5/1946 | United Kingdom . | |
| 922932 | 4/1963 | United Kingdom | 502/413 |

*Primary Examiner*—Carl F. Dees
*Attorney, Agent, or Firm*—Karl F. Ross; Herbert Dubno

[57] ABSTRACT

The granulates of active coke produced from pit coal have an inactive abrasion-proof core based on coal or a ceramic material, as well as an envelope based on active coke particles adhering to the core. Various processes for producing said granulates are disclosed. In one embodiment, a ground coal covering is applied to the core before activation; another embodiment provides for the application of a covering based on coke particles already activated. In a third embodiment, on the inactive core based on swollen and burned material there is first provided an intermediary layer based on a material which volatilizes partly during the carbonizing treatment in order to compensate for the expansion differences of the core and of the envelope.

7 Claims, 1 Drawing Figure

ACTIVE COKE PRODUCED FROM PIT COAL AND PRODUCTION PROCESS THEREOF

CROSS REFERENCE TO RELATED APPLICATIONS

This application is a national phase application corresponding to PCT/EP85/00110 filed Mar. 16, 1985 and based in turn upon a German national application P 34 10 892.0 filed Mar. 24, 1984 under the International Convention.

FIELD OF THE INVENTION

The invention relates to an activated coke produced from black coal in the form of granulates and a process for its manufacture.

BACKGROUND OF THE INVENTION

For the use of activated coke in a heaped or loose bed through which a medium to be treated must flow, the activated coke must be in the form of a granulate providing an adequate void volume for the medium which is to flow therethrough. Particularly when treating flue gases for desulphurizing and also for removing nitrogen compounds, these void volumes between the granulates are of considerable importance in order to attain the desired material exchange or the adsorption of noxious substances on the activated coke by intensive contact of the gas molecules with the surface of the activated coke over the shortest possible distance. The size of the granules determines the particular local void volume in the bed. In spite of the desirability of having relatively large voids in the bed, the activated coke granulates are conventionally manufactured and used with relatively small dimensions of the order of several mm. The reason for this is essentially that the manufacture of activated coke is relatively expensive and the material exchange or the adsorption takes place only in a relatively thin surface layer of the granulates. Accordingly, smaller sized granulates, requiring smaller amounts of activated coke afford a larger surface area than granulates of larger diameters. Moreover, the manufacture of granulates of larger diameters and having the required strength involves problems, particularly since when using such granulates in beds or heaps they are subjected to considerable and substantially varying pressure, in particular if the heaped materials or beds are moved through a duct or the like.

SUMMARY OF THE INVENTION

According to the present invention, the granulates referred to in the introduction comprise an inactive wear-resistant core of ceramic material and a coating of activated coke adhering to the core.

The better utilization of the activated coke required for a given granulate is based not only on the fact that the core of the granulates is composed of the aforesaid inactive ceramic material, but also on the fact that enlargement of the voids in the heaped materials or beds is made possible. A more intensive turbulence of the gases within these voids takes place resulting in a more frequent contact of the gas molecules with the surface layer of the granulates whereby the effectiveness of the material exchange or the adsorption can be improved considerably. In addition, because of the larger voids in the heaped structures, higher flow velocities of the gases passed through the heaped materials are attainable for lower pressure losses, whereby an improved aerodynamic effectiveness is attained when using the novel granulates. This is of particular interest in the context of flue gas decontamination, but is applicable whenever moving heaped materials or beds of the granulates are used with a flow passing therethrough.

It is advantageous for the granulates to have uniform longitudinal and transverse dimensions, more particularly a diameter between at least 6 and at the most 25 mm. Such dimensions result in favorable void volumes which result in the aforesaid effects. With the aforesaid dimensions there is also a favorable ratio of surface layer to void volumes between the granulates.

It is advantageous if the core of the granulates is composed of an expanded material based on alumina silicate. Such cores are on the one hand of low mass and adequately heat resistant. Moreover, they afford an appropriately structured surface in order to provide favorable adhesive effects with respect to the coating applied to the core.

However, the core may also be composed of another ceramic material, for example baked clay or the like.

It is important that the core, besides having the required pressure resistance, be adequately thermally resistant and permit an appropriate adhesion of the coating on the outer surface of the core. In the context of the aforementioned baked clay an expandible clay is particularly advantageous for the core of the granulates.

In a particularly advantageous embodiment the core of the granulates is formed at least partly from coal such as flaming coal, gas flaming coal (open burning coal) or brown coal. Such core material has the advantage of particularly favorable properties in the manufacture of the granulates with regard to expansion or shrinkage and that it can be re-used as a fuel once the coating has been worn down.

The coating of the granulates advantageously has a coating thickness between 1 and 3 mm, and in this context the coating thickness is preferably increased within the aforesaid limits as the core diameter is increased.

Although the granulates can have any desirable configuration, it is recommended for the attainment of uniform voids to make them approximately spherical. When using spherical granulates for the formation of the required heaped masses or beds, there will result over the cross section of the heaped masses or beds consistently uniform void volumes and thus also consistent flow resistances for the gas to be passed through the heaped materials or beds.

The manufacture of the aforedescribed granulates according to the invention can proceed in various ways. According to the invention, an advantageous process provides that carrier granulates forming the inactive core are formed from a ceramic raw material in a moist state and are dusted with rock dust and expanded and/or calcined. Thereafter a coating of powdered black coal brought into paste form with a binder is applied at a temperature of 200° to 500° C. by a rolling or pelletizing movement and the granules composed of the core and the coating are subjected to an activating treatment or to a pyrolysis and an activating treatment.

By dusting the carrier granulate in its moist condition, a particularly high adhesiveness between the carrier granulate and the coating to be applied is attained which is preserved even after the pyrolysis and activating treatment. Suitable rock dusts include those comprising chamotte, basalt, quartz and the like.

Binders of known types as known also from the manufacture of granulates composed entirely of activated coke may be used for converting the powdered black coal into a paste for forming the coating. For this purpose it is possible to use for example black coal or wood tar, inorganic gels such as silica gel, diluted pitch and the like. At the aforesaid temperatures of 200° to 500° C. and depending on the nature of the binder being used, the rolling or pelletizing movement will result in good adhesion of the coating prior to the subsequent pyrolysis and activating treatment taking place in the known manner.

In another alternative procedure the invention provides that carrier granulates are formed from the ceramic material, similarly in a moist condition, to form the active cores, these being dusted with rock dust and coated and/or calcined followed by the application of a coating of ground activated coke in a paste form using a binder, at a temperature between 200° and 500° C. by a rolling or pelletizing movement and the granulates composed of the core and the coating are subjected to a drying and pyrolysis treatment. Here the same binders may be used as have been described above in the context of the other process. Because ground activated coke is used for the coating, the activation treatment following the coating application is obviated. Instead only a drying and pyrolysis treatment is required, the temperature conditions during such drying and pyrolysis treatment being determined by the nature of the binder, the purpose of this treatment being to subject the binder substantially to chemical conversion in order to avoid disadvantageous effects due to the binder used on the action of the activated coke.

In order to avoid the formation of cracks and peeling off of the coating due to differences in thermal expansion of the core and the coating at the required heat treatment, the following procedure can be used with a core of ceramics, expandable inactive material:

Carrier granulates forming the inactive core are molded from a ceramic raw material in a moist condition and are calcined. The calcined core is coated with a coating of moistened comminuted wood flour, finely comminuted cellulose or highly comminuted organic plastics containing at the most, small proportions of filler substances and onto this layer a mixture of milled black coal, pitch and an emulsion of water, anthracene or flux oil and ammonium sulphite waste liquor is applied at room temperature by a rolling pelletizing movement and the granulates comprising the core and the coated are subjected to a drying treatment followed by a pyrolysis and activating treatment.

The interlayer provided according to that procedure compensates during the thermal treatment for the different expansion properties of the core and the outer coating.

In the case of granulates comprising a core composed at least partly of coal, the following process steps are particularly advantageous:

Carrier granulates forming the inactive core are formed from a raw material in a moist state and composed at least in part of coal. The carrier granulates are coated with a mixture of ground black coal, pitch and an emulsion of water, anthracene or flux of oil and ammonium sulphite waste liquor at room temperature by a rolling and pelletizing movement movement and the granulates comprising the core and the coating are subjected to a drying and subsequent pyrolysis and activating treatment. In manufacturing such granulates, there is attained not only an adaptation of the thermal expansion properties of the core and of its coating, but also an embodiment comprising a core which can later be combusted.

In all of the processes it is possible throughout to resubject granulates, the effectiveness of which has been reduced by their use and the resulting abrasion, and the coating of which is no longer of adequate thickness or has been completely removed by abrasion once again to an appropriate coating of activated coke. In this context worn down granulates comprising noncombustible cores can be stripped of residues of activated coke still remaining on their periphery by an appropriate combustion process and can be reused in the manner of the above described processes.

BRIEF DESCRIPTION OF THE DRAWING

In the sole FIGURE of this drawing a section through an activated coke granule according to the invention is illustrated way of a working example on an enlarged scale.

SPECIFIC DESCRIPTION denotes the ceramic core which has a porous expanded structure as seen in section.

Figure 1:
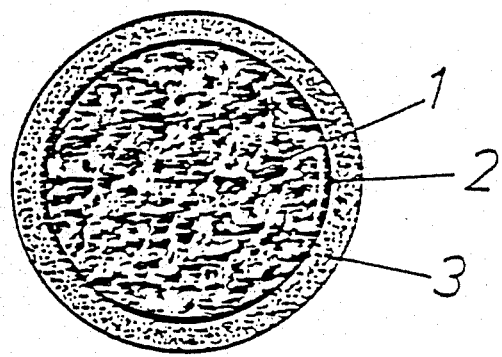

The layer 2 shown in exaggerated thickness, of rock dust is applied to the core 1 as an interface for binding the outer coating 3. The coating 3 comprises a matrix of activated coke particles and has a thickness which is small compared with the core diameter. aforesaid porous bloated structure due to the use of expandible raw materials, may also consist of a core of coal or a mixture of coal and clay or another comparable raw material.

It was found that by skilfully and judiciously applying the aforegoing teachings it is possible to so provide activated coke in the form of granulates as defined in the introduction that granulates of larger dimensions for creating correspondingly larger voids in heaped structures or beds can be manufactured economically and afford a favorable utilisation of the amount of activated coke required for the individual granules.

The black coal (bituminous coal) activated coke 3 is thus applied to an inactive abrasion-resistant core 1 of ceramic material. The granules can have uniform longitudinal and transverse dimensions or a diameter between at least 6 and not more than 25 mm. The core 1 of the granules can be composed of an alumina silicate-containing expanded material and the coating 3 of the granules can have a thickness between 1 and 3 mm. Preferably, as shown, the granules are of approximately spherical configuration.

The claims which follow are to be considered an integral part of the present disclosure.

We claim:

1. An active-coke granulate which is adapted to form a bed which can be traversed by a gas interacting with the active coke of the granulate, comprising granules each having a maximum dimension measured in two mutually perpendicular directions across the granule of 6 to 25 mm, each of said granules comprising:
    (a) an inactive wear-resistant core made from a composition consisting at least in part of an expanded aluminosilicate-containing ceramic material and at least in part of a coal selected from the group which consists of flaming coal, gas flaming coal and brown coal; and (b) an activated coke coating formed from bituminous coal and in a thickness of 1 to 3 mm covering said core and adherent thereto.

2. The granulate defined in claim 1 wherein each of said granules and the respective core has a ball shape and said dimension is a diameter of the granule.

3. An active-coke granulate which is adapted to form a bed which can be traversed by a gas interacting with the active coke of the granulate, comprising granules each having a maximum dimension measured in two mutually perpendicular directions across the granule of 6 to 25 mm, each of said granules comprising:
   (a) an inactive wear-resistant core made from a composition consisting at least in part of a coal selected from the group which consists of flaming coal, gas flaming coal and brown coal; and
   (b) an activated coke coating formed from bituminous coal and in a thickness of 1 to 3 mm covering said core and adherent thereto.

4. The granulate defined in claim 3 wherein each of said granules and the respective core has a ball shape and said dimension is a diameter of the granule.

5. A method of making an active-coke granulate which is adapted to form a bed which can be traversed by a gas interacting with the active coke of the granulate, comprising granules each having a maximum dimension measured in two mutually perpendicular directions across the granule of 6 to 25 mm, each of said granules comprising:
   (a) an inactive wear-resistant core made from a composition consisting at least in part of an expanded aluminosilicate-containing ceramic material and at least in part of a coal selected from the group which consists of flaming coal, gas flaming coal and brown coal; and
   (b) an activated coke coating formed from bituminous coal and in a thickness of 1 to 3 mm covering said core and adherent thereto, said method comprising the steps of:
      (A) forming said composition by mixing said coal and said expanded aluminosilicate-containing ceramic material in a moist state and forming cores therefrom;
      (B) coating the cores formed in step (A) with a mixture of ground bituminous coal, pitch, and an emulsion of water, anthracene or flux oil and ammonium sulphite waste liquor at room temperature by rolling pelletization;
      (C) drying the coated cores formed in step (B); and
      (D) subjecting the dried coated cores of step (C) to pyrolysis and activation to produce said granules with said activated coke coating.

6. A method of making an active-coke granulate which is adapted to form a bed which can be traversed by a gas interacting with the active coke of the granulate, comprising granules each having a maximum dimension measured in two mutually perpendicular directions across the granule of 6 to 25 mm, each of said granules comprising:
   (a) an inactive wear-resistant core made from a composition consisting at least in part of a coal selected from the group which consists of flaming coal, gas flaming coal and brown coal; and
   (b) an activated coke coating formed from bituminous coal and in a thickness of 1 to 3 mm covering said core and adherent thereto, said method comprising the steps of:
      (A) forming said composition by shaping said coal selected from the group which consists of flaming coal, gas flaming coal and brown coal in a moist state into said cores;
      (B) coating the cores formed in step (A) with a mixture of ground bituminous coal, pitch, and an emulsion of water, anthracene or flux oil and ammonium sulphite waste liquor at room temperature by rolling pelletization;
      (C) drying the coated cores formed in step (B); and
      (D) subjecting the dried coated cores of step (C) to pyrolysis and activation to produce said granules with said activated coke coating.

7. A method of making an active-coke granulate which is adapted to form a bed which can be traversed by a gas interacting with the active coke of the granulate, comprising granules each having a maximum dimension measured in two mutually perpendicular directions across the granule of 6 to 25 mm, each of said granules comprising:
   (a) an inactive wear-resistant core; and
   (b) an activated coke coating formed from bituminous coal and in a thickness of 1 to 3 mm covering said core and adherent thereto, said method comprising the steps of:
      (A) forming said cores by shaping a ceramic material in a moist state, and calcining the resulting shapes to form said cores;
      (B) coating the calcined cores formed in step (A) with a coating of moistened comminuted wood flour, finely comminuted cellulose and highly comminuted organic plastics containing at most small proportions of filler substance;
      (C) coating the cores formed in step (A) and coated in step (B) with a mixture of ground bituminous coal, pitch, and an emulsion of water, anthracene or flux oil and ammonium sulphite waste liquor at room temperature by rolling pelletization;
      (D) drying the coated cores formed in step (B); and
      (D) subjecting the dried coated cores of step (C) to pyrolysis and activation to produce said granules with said activated coke coating.

* * * * *